United States Patent
Kumar et al.

(10) Patent No.: US 10,106,680 B2
(45) Date of Patent: Oct. 23, 2018

(54) SIZING COMPOSITIONS FOR CARBON FIBERS

(71) Applicant: DOW GLOBAL TECHNOLOGIES LLC, Midland, MI (US)

(72) Inventors: Bhawesh Kumar, Lake Jackson, TX (US); Manesh Nadupparambil Sekharan, Midland, MI (US); Tzu-Chi Kuo, Midland, MI (US); Timothy J. Young, Bay City, MI (US); Adam H. Broderick, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 25 days.

(21) Appl. No.: 15/302,148

(22) PCT Filed: Apr. 6, 2015

(86) PCT No.: PCT/US2015/024520
§ 371 (c)(1),
(2) Date: Oct. 5, 2016

(87) PCT Pub. No.: WO2015/157177
PCT Pub. Date: Oct. 15, 2015

(65) Prior Publication Data
US 2017/0174881 A1 Jun. 22, 2017

Related U.S. Application Data

(60) Provisional application No. 61/976,082, filed on Apr. 7, 2014.

(51) Int. Cl.
| C08K 9/00 | (2006.01) |
| C08L 67/00 | (2006.01) |
| C08J 5/06 | (2006.01) |
| C08J 5/04 | (2006.01) |

(52) U.S. Cl.
CPC ............. C08L 67/00 (2013.01); C08J 5/042 (2013.01); C08J 5/06 (2013.01); *C08J 2367/00* (2013.01); *C08J 2463/04* (2013.01); *C08L 2201/54* (2013.01)

(58) Field of Classification Search
CPC ................... C08L 67/00; C08J 5/042
See application file for complete search history.

(56) References Cited

U.S. PATENT DOCUMENTS

| 3,779,993 | A | 12/1973 | Kibler et al. |
| 4,167,538 | A | 9/1979 | Taniguchi et al. |
| 4,762,751 | A | 8/1988 | Girgis et al. |
| 4,783,497 | A | 11/1988 | Thompson |
| 4,847,334 | A | 7/1989 | Thompson |
| 4,880,881 | A | 11/1989 | Minami |
| 4,981,905 | A | 1/1991 | Simons et al. |
| 5,063,261 | A | 11/1991 | Kroker et al. |
| 6,005,026 | A | 12/1999 | Piret et al. |
| 6,437,054 | B1 | 8/2002 | Chisholm et al. |
| 7,189,787 | B2 | 3/2007 | O'Brien et al. |
| 7,553,511 | B2 | 8/2009 | Hleong |
| 8,092,876 | B2 | 1/2012 | O'Brien et al. |
| 8,435,628 | B2 | 5/2013 | Tsotsis |
| 8,642,167 | B2 | 2/2014 | Tsotsis |
| 8,945,711 | B2 | 2/2015 | Higeshiro et al. |
| 9,402,219 | B2 | 7/2016 | Niemela et al. |
| 2007/0088117 | A1* | 4/2007 | Zhou ........................ C08J 3/05 524/539 |
| 2007/0141494 | A1* | 6/2007 | Zhou .................... G03G 9/0804 430/105 |
| 2012/0329907 | A1 | 12/2012 | Hong et al. |
| 2013/0122847 | A1 | 5/2013 | Seendripu et al. |
| 2013/0316109 | A1 | 11/2013 | Niederst et al. |

FOREIGN PATENT DOCUMENTS

| CN | 102899901 A | 1/2013 |
| CN | 103502355 A | 1/2014 |
| EP | 0311894 A2 | 4/1989 |
| EP | 1021383 B1 | 7/2000 |
| JP | H01-92234 A | 4/1989 |
| JP | 2004-107568 A | 4/2004 |
| JP | 2007-039868 A | 2/2007 |
| WO | 99/16720 A1 | 4/1999 |
| WO | 2013/122847 A1 | 8/2013 |

OTHER PUBLICATIONS

English translation of CN 102899901 (Year: 2013).*
Zeno Wicks, Jr., Frank N. Jones and S. Peter Pappas, Organic Coatings: Science and Technology, vol. 1, pp. 120-132 (John Wiley & Sons: New York, 1992).

* cited by examiner

*Primary Examiner* — Hannah J Pak
(74) *Attorney, Agent, or Firm* — Kagan Binder, PLLC

(57) ABSTRACT

The present invention provides aqueous, epoxy-based sizing compositions for carbon fibers. The size composition incorporates highly functionalized film forming epoxy novolac phenolic resins in combination with highly functionalized sulfonated polyesters having high Tg characteristics, sulfonate equivalent weights in the range from 2000 to 20,000 and number average molecular weights in the range from about 1000 to about 100,000. The present invention also provides corresponding sized carbon fibers and fiber-reinforced matrices.

20 Claims, 1 Drawing Sheet

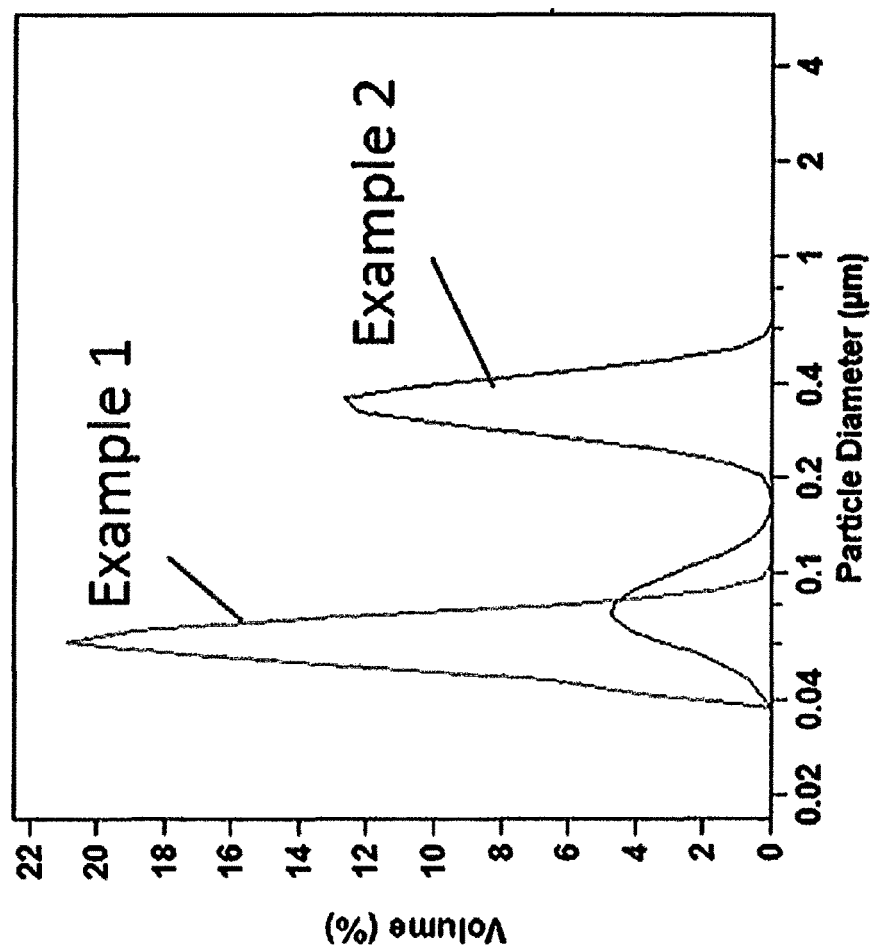

SIZING COMPOSITIONS FOR CARBON FIBERS

PRIORITY CLAIM

This application claims priority to International Application No. PCT/US2015/024520. filed Apr. 6, 2015, which in turn claims priority to U.S. Provisional Patent Application No. 61/976,082, filed Apr. 7, 2014, wherein the disclosures of these application are incorporated herein by reference in their respective entireties for all purposes.

FIELD OF THE INVENTION

The present invention relates to aqueous sizing compositions for carbon fibers. More specifically, the present invention relates to aqueous sizing compositions including epoxy functional resin(s) and sulfonated polyester resin(s).

BACKGROUND OF THE INVENTION

Carbon fibers have been used in a wide variety of structural applications and industries because of their desirable properties. For example, carbon fibers have low weight, excellent mechanical properties, high thermal stability, high chemical resistance, and high electrical conductivity. This allows carbon fibers to be used to reinforce composites that have high strength and high stiffness, while having a weight that is significantly lighter than a metal component of equivalent properties. Carbon fibers can be manufactured by converting a precursor fiber, such as a spun polyacrylonitrile (PAN) fiber. In many instances, the conversion occurs in a multi-step process in which the precursor fiber is heated, oxidized, and carbonized to produce a fiber that is 90% by weight or greater carbon.

In a typical application, carbon fibers are incorporated into a matrix to form a fiber-reinforced composite. In particular, composite materials have been developed in which carbon fibers serve as a reinforcing material in a resin, ceramic, cellulosic, or metal matrix. Carbon fibers optionally may be used in combination with other reinforcing agents. Carbon fiber reinforced composites are used in many different fields, including aerospace, automotive, trains, marine, weaponry, protective gear, electrical and microelectronic components, filters, civil engineering, sports equipment, industrial equipment, plumbing, decorative, furniture, appliances, office supplies, and the like.

Carbon fibers often are treated with sizing compositions in order to improve one or more fiber characteristics such as processing properties, handling properties, fiber protection, fiber bundle cohesion, bundling, spreadability, fluff formation resistance, fiber smoothness and softness, stiffness, abrasion resistance, and the like. Sizing compositions also can be used to help improve the composite properties, such as the degree of adhesion between the carbon fiber and a matrix. Furthermore, the size must as a whole be chemically compatible with the particular matrix material to make it possible to produce high-grade and durable composite materials.

A wide variety of sizing compositions have been proposed for carbon fibers. Epoxy resins currently are preferred as the basis of many sizing compositions. This preference is due, at least in part, to the fact that epoxy resins often are used as matrices for fiber reinforced composites. Epoxy matrices and epoxy-based sizes tend to be highly compatible. Additionally, the epoxy functionality has relatively high and favorable chemical reactivity toward a wide range of functional groups. This makes it easy to crosslink the size to enhance composite performance. This also makes it possible to use the epoxy based size with a wide range of other matrix materials. Further, cured epoxy resins have high thermal and chemical stability, to promote long, durable composite performance.

Generally, sizing compositions for carbon fibers are aqueous or nonaqueous. Nonaqueous size compositions also are referred to as organic or solvent-based. Aqueous sizing compositions are in increasing demand. Regulatory and safety aspects relating to toxicity and flammability of organic solvents are some reasons why the aqueous type is more preferred. In a typical aqueous sizing composition, the resin material is dispersed in water often with the aid of dispersants or emulsifiers.

Aqueous sizing compositions pose several technical challenges. As one, aqueous sizing compositions tend to show poor stability. For example, the dispersed resins might settle over time and be difficult to effectively re-disperse. Sometimes, stability can be improved by using more emulsifiers or surfactants in a sizing formulation, but this is not always beneficial overall. Undue quantities of low molecular weight emulsifiers and surfactants may unduly compromise the properties of resultant composites and/or the sized fibers. The ingredients also may be unduly co-reactive, causing either degradation or premature crosslinking of the resin components. These problems mean that aqueous sizing compositions may suffer from poor stability and shelf life.

Accordingly, there remains a strong need for improved aqueous sizing compositions that are epoxy based.

SUMMARY OF THE INVENTION

The present invention provides improved, epoxy-based sizing compositions for carbon fibers. The present invention is based at least in part upon using highly functionalized film forming epoxy novolac phenolic resins in combination with highly functionalized sulfonated polyesters having high Tg characteristics.

The sizing compositions provide many advantages. Significantly, the compositions are stable and have long shelf life. In tests, sizing compositions maintained viscosity and particle size characteristics over lengthy test periods spanning ten weeks, indicating that the compositions remained substantially unchanged during the test period. The use of highly functionalized materials allows the amount of small molecule dispersing aids to be reduced or even eliminated. The resin combination has excellent film forming characteristics and consistent coating coverage on carbon fibers. Composites incorporating the cured resins are thermally and chemically resistant. Processing conditions used to form the sizing composition are easily adjusted to control the stiffness of coated fibers. Composites incorporating the coated fibers show dramatically improved interlaminar shear strength.

In one aspect, the present invention relates to a sizing composition, comprising:

a) at least one film forming, epoxy functional, novolac phenolic resin; and b) at least one film forming, sulfonated polyester resin having a sulfonate equivalent weight in the range from 2000 to 20,000 and a number average molecular weight in the range from about 1000 to about 100,000; and c) an aqueous liquid carrier.

In another aspect, the present invention relates to a sized carbon fiber, comprising:

a) a carbon fiber; and b) a coating provided on at least a portion of the carbon fiber, said coating being derived from ingredients comprising at least one film forming, epoxy functional, novolac phenolic resin; and at least one film forming, sulfonated polyester resin having a sulfonate equivalent weight in the range from 2000 to 20,000 and a number average molecular weight in the range from about 1000 to about 100,000.

In another aspect, the present invention relates to a fiber reinforced matrix, comprising:

a) a matrix; and b) at least one coated carbon fiber incorporated into the matrix, said coated carbon fiber comprising:

(i) a carbon fiber; and (ii) a coating provided on at least a portion of the carbon fiber, said coating being derived from ingredients comprising at least one film forming, epoxy functional, novolac phenolic resin; and at least one film forming, sulfonated polyester resin having a sulfonate equivalent weight in the range from 2000 to 20,000 and a number average molecular weight in the range from about 1000 to about 100,000.

In another aspect, the present invention relates to a method of sizing a fiber, comprising the steps of:

a) providing an aqueous sizing composition comprising at least one film forming, epoxy functional, novolac phenolic resin; and at least one film forming, sulfonated polyester resin having a sulfonate equivalent weight in the range from 2000 to 20,000 and a number average molecular weight in the range from about 1000 to about 100,000; and b) using the aqueous sizing composition to form a coating on at least a portion of the carbon fiber.

In another aspect, the present invention relates to a method of making a sizing composition, comprising the steps of:

a) providing at least one film forming, epoxy functional, novolac phenolic resin;

b) providing at least one film forming, sulfonated polyester resin having a sulfonate equivalent weight in the range from 2000 to 20,000 and a number average molecular weight in the range from about 1000 to about 100,000;

c) melting the at least one film forming, epoxy functional, novolac phenolic resin and the at least one film forming, sulfonated polyester resin;

d) blending the melted resins to provide a blended admixture comprising at least one melted, film forming, epoxy functional, novolac phenolic resin and at least one melted film forming, sulfonated polyester resin; and e) combining the blended admixture with water in a manner effective to provide an aqueous dispersion, wherein at least a portion of said combining occurs while the blended admixture comprises at least one melted, film forming, epoxy functional, novolac phenolic resin and at least one melted film forming, sulfonated polyester resin.

BRIEF DESCRIPTION OF THE DRAWINGS

FIG. 1 shows particle size distribution curves for the resin particles incorporated into the size compositions prepared for Example 1a (shown as the Example 1 curve) and Example 2a (shown as the Example 2 curve).

DETAILED DESCRIPTION OF PRESENTLY PREFERRED EMBODIMENTS

Size compositions of the present invention include at least one film forming, epoxy functional, novolac phenolic resin. A phenolic resin is a resin that comprises two or more phenolic repeating units. The term "phenolic" with respect to a repeating unit refers to a structure that is a residue of a reactant that comprised at least one OH directly attached to an aromatic ring structure, more typically a ring structure having six atoms in the ring (e.g., a substituted benzene ring). In many instances, a phenolic resin is obtained by reacting one or more substituted or unsubstituted phenol reactants with one or more aldehydes. Examples of phenol reactants include phenol itself as well as substituted phenols. Illustrative substituted phenols often may be mono-substituted or di-substituted. If substituted phenols are used, these are preferably mono-substituted so that two sites remain for chain growth. Examples of substituted phenols include one or more of o-cresol, p-phenylphenol, p-tert-butylphenol, p-tert-amylphenol, cyclopentylphenol, p-tertoctyl phenol, bisphenol A, resorcinol, xylenol, cresylic acid, bisphenol-F, combinations of these and the like. Examples of additional suitable substituted phenols include any of those disclosed in U.S. application Ser. Nos. 13/570,632, 13/570,743, 61/681, 394, and 61/681,434. Derivatives of these reactants, such as etherified or acid functional derivatives, also may be used. Examples of aldehydes include one or more of formaldehyde, furfural, and /or acetaldehyde.

As used herein, "film forming" means that a resin on its own or in combination with a corresponding crosslinking agent forms a solid, optionally continuous, coating upon drying, crosslinking, solidifying, and/or otherwise physically or chemically changing from a coatable phase to a solid phase when coated on a carbon fiber substrate. Often, a resultant coating has a dry thickness in the range from 20 nm to 200 nm and remains a solid or semi-solid when at one or more temperatures in the range from 20° C. to 50° C. Often, resultant coatings may include amorphous and/or crystalline regions. Multiple coatings may be used to form multi-layer coatings in which at least one of the coating layers is made from ingredients comprising at least one film forming material.

Phenolic resins generally may be classed as either novolacs or resoles. A novolac resin is a phenolic resin in which an excess of phenolic reactant is used relative to aldehyde. These are often prepared using acidic catalyst(s). Novolac resins are referred to as two stage resins as these require both heat and a curing agent for thermoset curing. A resole resin is a phenolic resin in which an excess of aldehyde is used relative to phenolic reactant. These are often prepared using alkaline catalyst(s). Resole resins are referred to as one stage resins as these can cure via heat alone without requiring the presence of a curing agent. Upon exposure to sufficient heat, resole resins are self-crosslinking. However, as an option, curing agents may still be used with resole resins if desired. The present invention may use novolac and/or resole resins. Novolac resins are preferred.

Phenolic resins desirably have a number average molecular weight sufficiently high such that the resin includes 0.2 to 50, preferably 0.2 to 10, more preferably 0.2 to 4 phenolic repeating units on average.

The film forming, epoxy functional, novolac phenolic resin(s) include pendant epoxy functionality in the form of epoxy groups. An epoxy group is a moiety comprising a three-membered ring comprising two carbons and an oxygen. The epoxy ring may be substituted or unsubstituted. The epoxy functionality may be directly linked to the resin backbone or linked via a linking group. Exemplary linking groups include —$(CH_2)n$-, —$(OR^1)m$-, and the like, wherein each n and m independently is 1 to 20, preferably 1 to 8, more preferably 1 to 4; and $R^1$ is a linear, branched, or cyclic hydrocarbyl moiety of 1 to 8, preferably 1 to 4 carbon atoms.

The film forming, epoxy functional, novolac phenolic resin(s) have high epoxy functionality in order to enhance the performance of the size composition on fiber substrates and in resulting composites. High functionality means that a film forming, epoxy functional, novolac phenolic resin(s) includes on average 2 or more pendant epoxy groups per molecule, and even 3 or more epoxy groups per molecule. In some embodiments, a film forming, epoxy functional, novolac phenolic resin(s) includes at least one epoxy group per phenolic repeating unit incorporated into the resin. In many embodiments, the film forming, epoxy functional, novolac phenolic resin(s) have an epoxy equivalent weight in the range from 150 to 250, preferably 160 to 220, more preferably 165 to 190.

In addition to epoxy functionality, the film forming, epoxy functional, novolac phenolic resin(s) optionally may include one or more additional substituents. Examples include one or more of linear, branched or cyclic alkyl; aromatic moieties; ether groups, ester groups; unsaturated groups; hydroxyl groups; silicon containing groups; organometallic groups, combinations of these, and the like.

One embodiment of a film forming, epoxy functional, novolac phenolic resin(s) has a structure according to Formula 1:

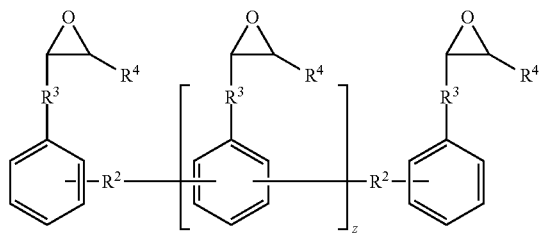

wherein each $R^2$ is a divalent hydrocarbyl moiety of 1 to 4, preferably 1 carbon atom; each $R^3$ independently is a divalent linking group, preferably a linear, cyclic, or branched group containing 1 to 20, preferably 1 to 8, more preferably 1 to 4 carbon atoms and optionally one or more hetero atoms such as O, N, P, or S; each $R^4$ independently is a monovalent moiety, preferably H or a linear cyclic or branched, saturated or unsaturated, aliphatic or aromatic moiety containing 1 to 8 carbon atoms and optionally one or more heteroatoms such as O, N, P, or S; and z on average is 0.2 to 50, preferably 0.2 to 10, more preferably 0.2 to 4.

A preferred embodiment of a resin according to Formula 1 has a structure according to Formula 2, wherein z is as defined above:

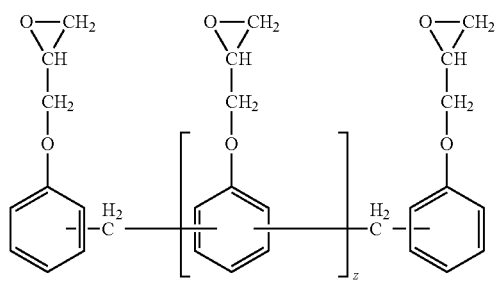

Epoxy resins having structures according to Formulae 1 and 2 are commercially available from the Dow Chemical Co., Midland, Mich., under trade designations including D.E.N 431, D.E.N 438, D.E.N 439, and D.E.R. 354.

The amount of the one or more film forming, epoxy functional, novolac phenolic resin(s) incorporated into a sizing composition may vary over a wide range. As general guidelines, using from about 10 to 60 parts by weight of one or more film forming, epoxy functional, novolac phenolic resin(s) per 40 to 90 parts by weight of the one or more sulfonated polyester resin(s) would be suitable.

The film forming, epoxy functional, novolac phenolic resin(s) are thermosetting. Generally, these are not cured or only minimally cured at the stage when incorporated and used to size fibers. Crosslinking of the phenolic resin(s) if practiced will tend to occur subsequently when sized fibers are incorparted into a matrix precursor and the matrix precursor cures.

The sizing compositions of the present invention further include one or more film-forming, sulfonated polyester resins. A polyester resin is a thermoplastic or thermosetting resin that includes at least one ester linkage as part of the resin backbone. Further, unless otherwise indicated, the use of a term designating a resin class such as, for example, "polyester," is intended to include resins that include polyester linkages in combination with one or more additional kinds of polymerized linkages. For example, a polyester resin also may include one or more urethane, urea, ether, carbamate, imide, amide, siloxane, bonds resulting from free radical polymerization, and/or other kinds of linkages in addition to polyester linkage(s). Polyester resins may be linear, branched, or cylic; saturated or unsaturated; or aliphatic or aromatic.

In the practice of the present invention, a polyester resin includes one or more polyester oligomers and/or one or more polyester polymers. An oligomer refers to a compound incorporating from two to ten repeating units. A polymer refers to a compound incorporating 11 or more repeating units. Repeating units typically are derived from one or more monomers. A monomer generally includes at least one polymerizable moiety and generally constitutes a single repeating block when incorporated into an oligomer or polymer. A monomer may be incorporated into oligomers or polymers via co-polymerization with itself or with one or more other kinds of monomers, oligomers, and/or polymers. Non-polymerizable terminal moieties, e.g., a monoalcohol or alkoxy group, are not considered repeating units for purposes of the present invention. The repeating units incorporated into oligomers and/or polymers may be the same or different. Unless otherwise expressly indicated, the terms "homo-oligomer" or "homopolymer" refer to compounds incorporating one kind of repeating unit. The terms "co-oligomer" and "copolymer" refer to compounds incorporating two or more different kinds of repeating units. The term "oligomer" encompasses both homo-oligomers and co-oligomers. The term "polymer" encompasses both homopolymers and copolymers.

Monomers often have number average molecular weights in the range from about 50 to about 1000. Oligomers often have number average molecular weights in the range from about 100 to about 10,000, even from about 250 to about 5000. Polymers often have number average molecular weights in the range from about 1000 to 1,000,000 or even from about 2000 to about 250,000, or even from about 2000 to about 50,000, or even 3000 to 25,000.

Polyester resins of the present invention are sulfonated, meaning that each such resin molecule on average incorporates at least one pendant sulfonate moiety, preferably two or more sulfonate moieties per molecule, and even three or more sulfonate moieties per molecule. In illustrative embodiments, a sulfonated polyester resin has a sulfonate equivalent weight in the range from 2000 to 20,000, preferably 2000 to 6000. In one embodiment, a suitable sulfonate equivalent weight is about 5000 in a polyester comprising two or more sulfonate groups.

Sulfonated polyester resins of the present invention can have a number average molecular weight over a wide range. In illustrative embodiments, polyester resins have a number average molecular weight in the range from about 1000 to about 100,000, preferably about 1000 to about 50,000, more preferably about 1000 to about 20,000. In one embodiment, using a sulfonated polyester resin with a number average molecular weight of about 10,000 would be suitable.

As used herein, a sulfonate group generally has the formula —(SO$_3$)M, wherein M is a monovalent cation such as Na$^+$, K$^+$, Li$^+$, quaternary ammonium, or the like. In some embodiments, multiple sulfonate groups may share a common counter cation, in which case such a common cation has a valency higher than one. Examples include Ca$^{++}$, Mg$^{++}$, combinations of these and the like. Sulfonate groups promote compatibility (solubility or dispersability) in aqueous media. Sulfonate groups also are substantially inert with epoxy functionality, which is important in the present invention due to the high epoxy functionality of the epoxy functional novolac phenolic resin(s). In contrast, carboxylate functionality tends to be co-reactive with epoxy functionality, making sizing compositions with undue amounts of carboxylate functionality less stable over time.

Sulfonate groups may be directly attached to a resin backbone or may be attached via a linking group. Preferred sulfonate groups are attached to a resin backbone by a linking group including an aromatic moiety or an aromatic backbone moiety. More preferred sulfonate groups are directly attached to an aromatic ring, which otherwise may be substituted or unsubstitued. In additional embodiments, a sulfonate moiety is attached to an aromatic ring, which in turn is coupled to a backbone by a further linking group portion comprising a divalent —SO$_3$— moiety. Exemplary polyester resins including sulfonate groups and corresponding aromatic backbone segments and/or aromatic liking groups, some of which include the divalent —SO$_3$— moiety, are further described in U.S. Pat. No. 3,779,993.

As used herein, a sulfo-sulfonate moiety refers to a moiety including at least one sulfonate group and at least one divalent —SO$_3$— moiety. In preferred embodiments, a sulfonated polyester resin incorporates a plurality of sulfo-sulfonated backbone moieties such as one or of the following sulfonate and/or sulfo-sulfonate structures, wherein M is as defined:

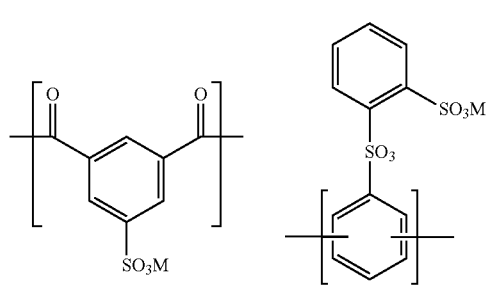

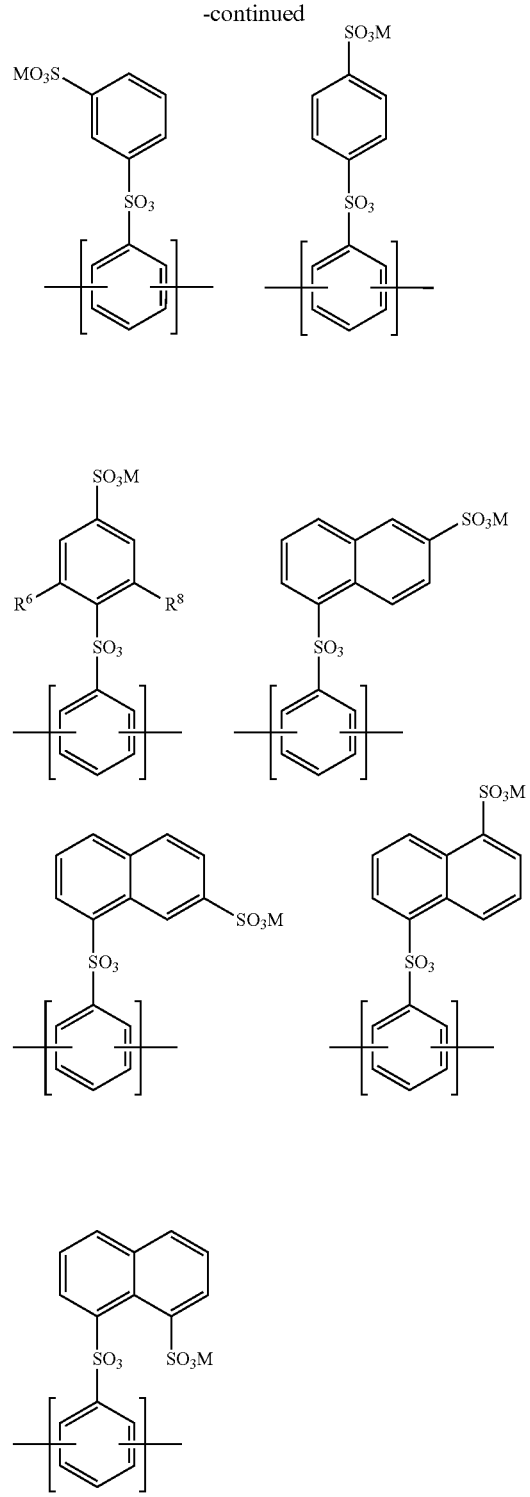

In addition to sulfonate functionality, the film forming, sulfonated polyester resin(s) optionally may include one or more additional substituents. Examples include one or more of linear, branched or cyclic alkyl; aromatic moieties; ether groups, ester groups; unsaturated groups; hydroxyl groups; epoxy groups, silicon containing groups; organometallic groups; combinations of these, and the, like.

In many embodiments, a sulfonated polyester resin has the following sulfonated, linear structure

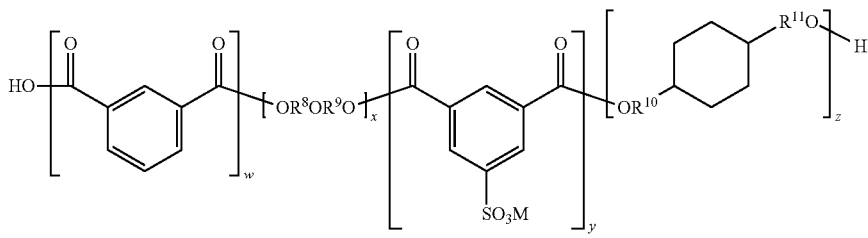

wherein each $R^8$, $R^9$, $R^{10}$, and $R^{11}$ independently is a saturated or unsaturated, aromatic or aliphatic, divalent hydrocarbyl moiety, preferably a hydrocarbyl moiety of 1 to 20, more preferably 1 to 4 carbon atoms; and each w, x, y, and z is in the range from 1 to 200 such that the sum of w +x +y +z is effective to provide a number average molecular weight in the range from 2000 to 50,000, preferably 4000 to 16,000 and a weight average molecular weight in the range from 10,000 to 50,000, preferably 20,000 to 30,000; and M is a monovalent or divalent cation such as H+, Na+, Li+, quaternary ammonium, Ca2+, Mg2+, combinations of these, and the like. In a preferred embodiment, $R^8$ and $R^9$ is —$CH_2CH_2$—, and each of $R^{10}$ and $R^{11}$ is —$CH_2$—.

In other embodiments, a sulfonated polyester resin has the following sulfonated, linear structure

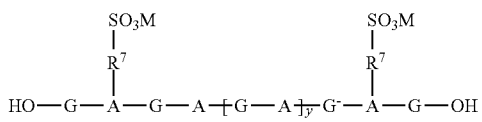

wherein A is the residue of a dicarboxylic acid or corresponding anhydride; G is the residue of a diol moiety; $R^7$ is a divalent linking group, preferably an aromatic linking group include an —$SO_3$— moiety; each M independently is as defined above; and y has an average value such that the resin has a number average molecular weight in the range from about 1000 to about 100,000, preferably about 1000 to about 50,000, more preferably about 1000 to about 20,000. Examples of suitable dicarboxylic acids, glycols, and sulfonated polyester resins having this structure have been described below and also in U.S. Pat. No. 3,779,993.

The one or more film forming, sulfonated polyester resins are generally characterized by relatively high glass transition temperature (Tg) of at least 35° C., preferably at least 40 ° C., and more preferably at least 50° C., or even at least 120° C. Desirably, the Tg of such resins is less than 130° C., even less than 100° C. Without wishing to be bound by theory, it is believed that using sulfonated polyester resins with such Tg characteristics helps to provide a non-tacky size film. In the practice of the present invention, Tg is measured according to ASTM D 3418 using differential scanning calorimetry.

A polyester resin may have any suitable hydroxyl number. Hydroxyl numbers are typically expressed as milligrams of potassium hydroxide (KOH) equivalent to the hydroxyl content of 1 gram of the hydroxyl-containing substance. The polyester resin preferably has a hydroxyl number from about 0 to about 50, more preferably 1 to 20, even more preferably 1 to 10 mg KOH per gram of polyester resin.

A polyester resin may have an acid number over a wide range. Acid numbers are typically expressed as milligrams of KOH required to titrate a 1-gram sample to a specified end point. The range of suitable acid numbers may vary depending on a variety of considerations including, for example, whether water dispersibility is desired. The polyester resins preferably have an acid number (AN) of about 0 to about 50 mg KOH/g resin, preferably from about 0 to about 20 mg KOH/g resin, more preferably from 0 to about 10 mg KOH/g. In some embodiments, polyester resins with an acid number less than 2 would be suitable.

Methods for determining acid numbers are well known in the art. For example, acid number may be determined using the titrimetric method described in ISO Standard XP-000892989. Hydroxyl number may be determined using the same standard test method, substituting a solution of hydrochloric acid in ethanol for the potassium hydroxide in ethanol titrant, and expressing the neutralization endpoint equivalents of hydrochloric acid in terms of the molar equivalents of potassium hydroxide.

The amount of the one or more film forming, sulfonated polyester resins incorporated into a sizing compostion may vary over a wide range. As general guidelines, using from about 40 to 90 parts by weight of the polyester resin(s) per 10 to 60 parts by weight of the film forming, epoxy functional, novolac phenolic resin(s) would be suitable.

Suitable polyester resins may be obtained in accordance with conventional procedures well known to those of ordinary skill in the art. According to an illustrative synthesis strategy, a polyester resin is prepared by condensation (esterification) according to known processes. See, e.g., Zeno Wicks, Jr., Frank N. Jones and S. Peter Pappas, *Organic Coatings: Science and Technology*, Vol. 1, pp. 122-132 (John Wiley & Sons: New York, 1992)]. The reaction may occur in the presence of a conventional esterification catalyst at an elevated temperature with or without solvent. Generally, resins are obtained by co-polymerizing reactants that are polyfunctional with respect to OH and/or carboxylic acid. Similarly reactive derivatives of these groups also may be used. For example, anhydrides or esters of carboxylic acid may be used. Collectively, carboxylic acid, anhydrides, esters, and other derivatives of these that are co-reactive with OH to form ester linkages shall be referred to as co-reactive carboxylate functionality. The polyester resin often is derived from a mixture of reactants containing at least two of (a) one or more polyols, preferably including at least dihydroxy and optionally trihydroxy polyols; (b) one or more compounds comprising two or more co-reactive carboxylate functionalities, preferably including at least diacid and optionally triacid functionality; and (c) one or more compounds that containing at least one OH group and at least one co-reactive carboxylate functionality such as a caprolactone reactant.

The general equation for the reaction of a diol with a diacid to form an exemplary linear polyester is the following:

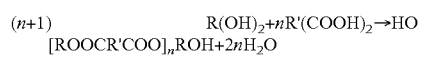

wherein n has a value such that the resultant polyester diol has a desired number average molecular weight such as being within the weight ranges specified above; and each of R' and R is a divalent moiety, often a divalent polyether or hydrocarbyl moiety of 1 to 3000 carbon atoms. The diacid reactant may also be present in other forms that are co-reactive with the diol reactant.

Illustrative of the diacids or anhydrides that may be used to prepare the polyesters include, but are not limited to, maleic acid, maleic anhydride, malonic acid, fumaric acid, succinic acid, succinic anhydride, glutaric acid, adipic acid, 2-methyl-1,6-hexanoic acid, pimelic acid, glutaric acid, methyltetrahydrophthalic acid, methylhexahydrophthalic acid, suberic acid, dodecanedioic acid, phthalic acid, phthalic anhydride, 5-tert butyl isophthalic acid, tetrahydrophthalic acid, tetrahydrophthalic anhydride, hexahydrophthalic acid, hexahydrophthalic acid, hexahydrophthalic anhydride, endomethylenetetrahydrophthalic acid, endomethylenetetrahydrophthalic anhydride, azelaic acid, sebacic acid, tetrachloro-phthalic acid, tetrachlorophthalic anhydride, chlorendic acid, isophthalic acid, trimellitic anhydride, terephthalic acid, naphthalene dicarboxylic acid, cyclohexane-dicarboxylic acid, and mixtures thereof. In some embodiments, the alkanedioic acids may contain from 4 to 12 carbon atoms. It is also understood that an esterifiable derivative of a diacid, such as a dimethyl ester or anhydride of a polycarboxylic acid, can be used to prepare the polyester.

Illustrative of the diols that can be used to prepare the polyesters include, but are not limited to, ethylene glycol, diethylene glycol, triethylene glycol and higher polyethylene glycols, propylene glycol, dipropylene glycol, tripropylene glycol and higher polypropylene glycols, 1,3-propanediol, 1,4-butanediol and other butanediols, 1,5-pentanediol and other pentane diols, hexanediols, decanediols, and dodecanediols, glycerol, trimethylolpropane, neopentyl glycol, hexylene glycol, trimethylolethane, neopentyl glycol, a polyethylene or polypropylene glycol having a number average molecular weight of about 500 or less, polyether glycols having a number average molecular weight from about 94 to about 5000, and mixtures thereof. In some embodiments, the aliphatic glycol may contain from 2 to about 8 carbon atoms. Other embodiments of the present invention may use aliphatic diols such as UNOXOL™ (a mixture of cis and trans 1,3- and 1,4-cyclohexanedimethanol) available from The Dow Chemical Company (Midland, Mich.). Optionally, if branched polyesters are desired, the polyol mixture includes at least one tri-hydroxy or higher functional alcohol (e.g. triol) and/or the acid reactant includes at least one tri-acid or higher functional acid.

Examples of suitable linear, film forming, sulfonated polyester resins are commercially available from Eastman Chemical Company under the trade designation AQ™ polymers, including Eastman AQ 38S, Eastman AQ 55S, and Eastman AQ 48.

The sizing composition includes an aqueous liquid carrier. As used herein, "aqueous" means that the solvent ingredients (e.g., water and optional organic solvents, if any) of the continuous phase include at least 10 weight percent, preferably at least 40 weight percent, more preferably at least 70 weight percent, even at least 90 weight percent, or even 100 weight percent water on the total weight of the solvent ingredients. A wide range of one or more optional organic solvents may be used in the aqueous liquid carrier, if desired. It is desired that any such organic solvent, if used, is able to form a single liquid phase with water when an admixture of 5 parts by weight of the organic solvent and 95 parts by weight of water are at equilibrium at 25° C. Examples of suitable organic solvents include one or more of at least one alcohol (methanol, ethanol, isopropanol, butanol, and/or the like); at least one glycol; at least one ether, compounds containing both ether and OH (e.g., a glycol ether such as monobutyl ether of ethylene glycol or diethylene glycol); tetrahydrofuran; propylene carbonate; at least one ketone (acetone, methyl ethyl ketone, and/or the like); combinations of these, and the like.

Sizing compositions of the present invention may include one or more optional ingredients. Suitable optional ingredients include, for example, those that improve the processability or manufacturability or storage stability of the composition, enhance composition aesthetics, or improve a particular functional property or characteristic of the coating composition or the resultant cured composites incorporating sized fibers. Optional ingredients that may be included are one or more other types of resins, catalysts, initiators, additional polymers, emulsifiers, pigments, metal powders or paste, fillers, anti-migration aids, anti-microbials, extenders, curing agents, lubricants, coalescents, wetting agents, biocides, plasticizers, crosslinking agents, antifoaming agents, pigments, colorants, waxes, anti-oxidants, anticorrosion agents, flow control agents, thixotropic agents, flow control agents, dispersants, adhesion promoters, pH adjustment agents, UV stabilizers, scavenger agents or combinations thereof. Each optional ingredient can be included in a sufficient amount to serve its intended purpose, but preferably not in such an amount to adversely affect the manufacturability, handling or storage of the size composition or unduly impact properties of cured composites resulting therefrom. U.S. Pat. No. 7,189,787 and U.S. Pat. No. 8,092,876 further describe such optional ingredients.

Size compositions of the present invention can be made using a variety of techniques. According to one mode of practice, a first aqueous dispersion is provided containing the film forming, epoxy functional, novolac phenolic resin(s), an aqueous liquid carrier, and optionally all or a portion of optional ingredients to be incorporated into the size composition. A dispersant may be helpful, for instance, to help disperse the epoxy functional resin(s) in the aqueous media. The concentration of the phenolic resin(s) may vary over a wide range. For example, using 20 to 250 parts by weight of the phenolic resin(s) per 100 parts by weight of the aqueous liquid carrier would be suitable.

A second aqueous dispersion also is provided. The second aqueous dispersion contains the film forming, sulfonated polyester resin(s), and aqueous liquid carrier, and optionally all or a portion of optional ingredients to be incorporated into the size composition. In many modes of practice, the sulfonated polyester resin(s) is water soluble or water dispersible without needing to add any dispersing aids, although such aids can be used if desired. The concentration of the polyester resin(s) may vary over a wide range. For example, using 20 to 45 parts by weight of the polyester resin(s) per 100 parts by weight of the aqueous liquid carrier would be suitable. The film forming, epoxy functional, novolac phenolic resin(s) and the film forming, sulfonated polyester resin(s) are used in amounts such that the resultant size composition includes 10 to 60 parts by weight of the film forming, epoxy functional, novolac phenolic resin(s) per 40 to 90 parts by weight of the film forming, sulfonated polyester resin(s).

The first and second aqueous dispersions are then combined and blended to prepare a homogenous size composition. Optionally, if not already added, all or a portion of optional ingredients may be incorporated into the sizing composition after the first and second dispersions are blended. Blending may occur at a variety of temperatures, e.g., at a temperature from 0° C. to 100° C., preferably 20° C. to 85° C. The dispersions may be blended under ambient atmosphere or in an inert atmosphere.

Optionally, blending may occur under sufficient conditions to provide dispersed particles comprising the resin(s) having an average particle diameter in the range from 0.02 to 4 micrometers, preferably 0.035 to 1 micrometers, more preferably 0.035 to 0.2 micrometers, even more preferably 0.035 to 0.1 micrometers. Particle size can impact properties of the sized fibers. Larger particle sizes tend to provide stiffer sized fibers, while smaller particle sizes tend to provide more flexible sized fibers. Accordingly, blending conditions can be used to obtain particle sizes that provide the desired degree of stiffness in the sized fibers.

According to another mode of practice, size compositions may be prepared using extruder techniques such as are described in U.S. Pat. Pub. No. 2012/0329907 and PCT. Pub. No. 2013/122847. For example, film forming, sulfonated polyester resin(s) in solid pellet form may be fed into a twin screw extruder. Preheated film forming, epoxy functional novolac phenolic resin(s) are preheated and delivered to the melt zones of the extruder. The temperature(s) of the zones are sufficient to allow the extruder to blend the resins together in the melt phase. The feed rates of the resins are suitable to provide sizing compositions with the desired resin formulation, e.g., 10 to 60 parts by weight of the film forming, epoxy functional, novolac phenolic resin(s) per 40 to 90 parts by weight of the film forming, sulfonated polyester resin(s).

After the blending, preheated water is fed into an emulsification zone of the extruder. Using 50 to 200 parts by weight of preheated water per 100 parts by weight of sulfonated polyester resin(s) is suitable for this stage. Desirably, at least portions of the resins are in the melt phase during at least a portion of the time that the water is added. Additional preheated water is then added to the extruder after the emulsification zone to obtain an aqueous dispersion having the desired solids content, e.g., 5 to 50 parts by weight, preferably 20 to 50, more preferably about 30 parts by weight of resins per 100 parts by weight of the dispersion. The resulting dispersion optionally may then be filtered if desired. In preferred embodiments the aqueous dispersion is an aqueous emulsion.

Preparing the sizing composition by blending the first and second aqueous dispersions with comminution of the resin particles tends to provide dispersed particles with a log normal particle size distribution. This is preferred to make more flexible sized fibers. Preparing the sizing composition via the extrusion technique tends to provide dispersed particles with a bimodal particle size distribution. A bimodal distribution helps to provide stiffer sized fibers.

To measure particle size, a Beckman Coulter LS13-320 particle size analyzer is used with a Universal Liquid Module as the sample delivery system. The instrument conforms to the ISO 13-320 standard. The software version utilized is Version 6.01. Hardware and software are obtained from Beckman Coulter Inc., Miami, Fla. The analysis conditions for all measurements uses a fluid refractive index of 1.332, a sample real refractive index of 1.5, and a sample imaginary refractive index of 0.0. The extended optical model is not used. The polarization intensity differential scattering (PIDS) option is activated and used to generate the particle size information. The volume average particle size diameter are measured and reported in nm or micrometers. A Coulter LATRON™ 300 LS latex standard is used to calibrate the particle size analyzer.

The sizing compositions of the present invention are particularly useful for sizing carbon fiber, alternatively referred to as graphite fiber, carbon graphite or CF. In many embodiments, a typical carbon fiber is a thread formed from a bundle of carbon fiber filaments, often thousands of filaments. A carbon fiber filament often is a tube having a diameter in the range from about 1 to about 25 micrometers, even 5 to 10 micrometers. A majority, and even substantially all of such a filament is carbon atoms. It is believed that the atomic structure of the carbon is similar to that of graphite such that sheets of carbon atoms (grapheme sheets) form the filament, wherein the carbon atoms are bonded together in crystalline form and are arranged in a regular, hexagonal pattern. Unlike graphite however, it is believed that the sheets in a carbon fiber filament are much more strongly interlocked or otherwise attached to each other by chemical and/or physical and/or mechanical attachments. To produce carbon fiber, it is believed that the carbon atoms are bonded together in crystals that are more or less aligned parallel to the long axis of the fiber. It is further believed that this crystal alignment gives the resultant fibers high strength-to-volume ratio (making a fiber strong for its size). Several thousand carbon fibers often are bundled together to form a tow, which may be used by itself or woven into a fabric. The properties of carbon fibers, such as high stiffness, high tensile strength, low weight, high chemical resistance, high temperature tolerance and low thermal expansion, make them very popular in aerospace, civil engineering, military, and motorsports, along with other competition sports.

Carbon fibers can be derived from one or more precursors. Examples of precursors include polyacrylonitrile (PAN), polyolefm, mesophase pitch, combinations of these, and the like. Depending upon the precursor and technique to make the fiber, carbon fiber may be turbostratic or graphitic, or have a hybrid structure with both graphitic and turbostratic parts present. In turbostratic carbon fiber the sheets of carbon atoms are haphazardly folded, or crumpled, together. Carbon fibers derived from Polyacrylonitrile (PAN) often are turbostratic, whereas carbon fibers derived from mesophase pitch are graphitic after heat treatment at temperatures exceeding 2200° C. Turbostratic carbon fibers tend to have high tensile strength, whereas heat-treated mesophase-pitch-derived carbon fibers have high Young's modulus (i.e., high stillness or resistance to extension under load) and high thermal conductivity. PAN-based carbon fibers are preferred in the practice of the present invention.

Suitable carbon fibers are commercially available from a variety of commercial sources including Dow Aksa, Cytec Industries, Formosa Plastics, Hexcel, Mitsubishi Rayon, SGL Carbon, Toho Tenax, Toray Industries and Zoltek. Carbon fibers are further described in U.S. Pat. Nos. 8,642, 167, 8,591,859, and 8,435,628.

To apply a size according to the present invention to carbon fibers, a bath of the size composition is prepared. The bath may be chilled, at ambient, or heated. Carbon fibers are pulled through the bath and subsequently dried. Drying may occur in an oven at a temperature high enough to facilitate drying but not so high that the resin(s) or other ingredients of the size might be unduly thermally degraded. Drying with hot air at 75° C. to 175° C., for instance, would be suitable in many embodiments. The resultant size has excellent film forming coverage and provides uniform, consistent coverage of the fiber surface.

The amount of the sizing composition applied to the fibers may vary over a wide range. Generally, a sufficient amount of sizing composition is applied to coat a majority and preferably all of the fiber surface. In illustrative embodiments, sized fibers include 0.1 to 10 weight percent, preferably 0.5 to 2 weight percent of dried size composition based on the total weight of the sized fiber.

Sized fibers of the present invention may be used to reinforce a wide variety of thermoplastic and thermosetting polymer matrices to thereby form very strong, lightweight composities. Non-polymer materials also may be reinforced by the sized fibers. Examples of nonpolymer materials include graphite, metals, metal alloys, intermetallic compositions, and ceramic materials. The sized fibers optionally may be used in combination with other reinforcing materials such as polyaramid fibers, cellulosic fibers, fiberglass, combinations of these, and the like. Examples of thermosetting polymer matrices include epoxy-based systems (examples are commercially available from System Three, Gougeon Bros, MAS, the Dow Chemical Co., and the like), polyester-based systems (examples are commercially available from U.S. Composites, TAP Plastics, and the like), vinylester-based systems (examples are commercially available under trade designations such as Marpro, Multi-tech, Deralcane Momentum, Hi-Bond, and the like), or the like. Thermoplastic polymer systems include polyolefin, polyester, polyurethane, epoxy, (meth) acrylic, combinations of these, and the like.

The sized fibers may be incorporated into matrices in a variety of forms. Examples include woven or non-woven cloth (optionally such cloth may be oriented such as biaxially oriented), mat, chopped fibers, aligned strands, continuous fibers, combinations of these, and the like.

The present invention will now be described with reference to the following illustrative examples.

EXAMPLE 1

Preparing Size Composition Using Extrusion Techniques

Pellets of a film forming, sulfonate functional Polyester (Eastman Chemical Co., AQ 55s) polymer was fed into a twin screw extruder using a solid feeder. A preheated DEN 438 film forming, epoxy functional novolac phenolic resin (Dow Chemical Co., DEN 438) was preheated to 70° C. and delivered into the melt zones of the extruder set at 140° C. The polyester and phenolic resins were blended by the extruder in the melt phase. The resins were fed at a rate to provide a blend including 70 parts by weight of sulfonated polyester resin and 30 parts by weight of epoxy functional resin.

After melt phase blending, an initial stream of preheated deionized (DI) water at 140° C. was fed into the emulsification zone of the extruder at a rate equivalent to the polyester feed rate using a piston pump. Additional DI water at 140° C. was introduced into the extruder after the emulsification zone to dilute the dispersion to 30% solids. The dispersion was filtered through 190 micron.

This dispersion including 70 parts by weight of the polyester and 30 parts by weight of the epoxy is referred to in these Examples as Example 1a. The same procedure was used to prepare a similar Example 1b, except Example 1b included 50 parts by weight of the polyester and 50 parts by weight of the epoxy.

EXAMPLE 2

Preparing Size Composition from Aqueous Resins

An aqueous solution/dispersion was prepared by dissolving 30 parts by weight of a film forming, sulfonated polyester resin (Eastman Chemical Company AQ55s polymer) in 70 parts by weight of water at 80° C. in a round-bottom flask under agitation. Polyester dispersion equivalent to 70 parts by weight of the polyester resin was then blended with epoxy dispersion (Dow Chemical, OudraSperse™ WB 4001) equivalent to 30 parts by weight of the epoxy resin. The OudraSperse™ WB 4001 epoxy dispersion contained 57 wt. % of epoxy resin and 43 wt. % of water. Blending occurred by stirring for 5 to10 minutes at ambient temperature.

This dispersion including 70 parts by weight of the polyester and 30 parts by weight of the epoxy is referred to in these Examples as Example 2a. The same procedure was used to prepare a similar Example 2b, except Example 2b included 50 parts by weight of the polyester and 50 parts by weight of the epoxy.

EXAMPLE 3

Particle Size Distribution

The particle size distribution of the resin particles incorporated into the size compositions prepared in Examples 1a and 2a were evaluated. The resultant particle size distribution curves are shown in FIG. 1 as curves for Example 1 and 2, respectively.

Example 1a (Example 1 curve in FIG. 1) provided a size composition with a log normal particle size distribution. Example 2a (Example 2 curve in FIG. 1) provided a bimodal particle size distribution. Example 1a would be more suitable for providing flexible, sized fibers. Example 2a could be more suitable to provide stiffer, sized fibers.

EXAMPLE 4

Preparing Sized Fiber Using Size Composition of Example 1a and 1b

The size composition of each of Example 1a and 1b was diluted using DI water to 2-5 wt % solids. This diluted dispersion was as a sizing bath. Unsized carbon fiber tows (PAN-based) were passed through the sizing bath to coat the fibers with the sizing composition. The wet fiber tows were pulled from the sizing bath and then passed through a drying oven that was maintained between 90-120° C. The coated fiber dried in the drying oven and was wound on a take up spool.

EXAMPLE 5

Preparing Sized Fiber Using Size Composition of Example 2a and 2b

The procedure of Example 4 was used to prepare sized carbon fibers using the size composition of Examples 2a and 2b.

EXAMPLE 6

Oven Stability Testing

The oven stability of the size composition of Example 1a was evaluated. The stability study was carried out by placing a glass jar filled with the sizing composition in an oven at 40° C. for an extended period. The viscosity and particle size characteristics of the size composition were analyzed over an extended period to assess any change in particle size and/or viscosity from the original state. An increase of particle size, viscosity and visual evidence for coagulated emulsions indicate destabilization of dispersions. A Brookfield viscometer (DV was used (20 rpm, spindle# 1) to measure the viscosity. The data is reported in the following table:

|  | Viscosity (mP s)* | Particle size (nm) |
| --- | --- | --- |
| Week 0 (freshly made) | 157 (at 22.7° C.) | 61 |
| Week 4 | 124 (at 23.7° C.) | 61 |
| Week 10 | 129 (at 20.7° C.) | 63 |
| Week 14 | 129 (at 24.7° C.) | 65 |

*value in parentheses is temperature in degrees C.

The data shows that both viscosity and particle size remained consistent for a ten-week period. This indicates that the size composition of Example 1a has excellent stability and shelf life.

EXAMPLE 7

Matrix Adhesion Test to assess Interfacial Shear Strength

A microbond pullout test was used to quantitatively evaluate the adhesion between a single carbon fiber (sized or unsized, as the case may be, as reported in the table below) and a typical epoxy matrix. Samples for this test were prepared by depositing a small (50-80 micrometer length) droplet of uncured epoxy (15 parts Dow Chemical Co. DEH 26 product blended with 100 parts Dow Chemical Co. DER 354 product) on a single carbon fiber, followed by curing the epoxy at elevated temperature. The prepared sample was placed in a designed holder to fix the cured bead in place while allowing the fiber to move. The fiber is then pulled with increasing force until the fiber de-bonds from the epoxy bead. The maximum recorded force before slipping is used to calculate the interfacial shear strength (IFSS) of the fiber/epoxy interface.

| Carbon Fiber Sample | Polyester/epoxy weight ratio | Average IFSS (MPa) |
| --- | --- | --- |
| Commercial sized carbon fiber |  |  |
| Sized Fiber A |  | 70 |
| Sized Fiber B |  | 79 |
| Commercial sizing applied to DowAksa carbon fiber |  | 70 |
| Example 1a sizing applied to unsized DowAksa carbon fiber | 70/30 | 81 |
| Example 1b sizing applied to DowAksa carbon fiber | 50/50 | 85 |

According to an illustrative industry specification, carbon fibers desirably show an average IFSS of 79 MPa. Commercially available Fibers A and B are different from the DowAksa carbon fiber, and only Fiber B meets the specification. The DowAksa fiber with commercially available sizing did not meet the specification, but its IFSS is significantly improved by the sizing compositions of the present invention. Significantly, the data shows that the sizing compositions of the present invention can take a fiber that on its own is unable to meet the specification but then exceeds the specification after being sized. Being able to improve the IFSS is a significant performance advantage.

EXAMPLE 8

Interlaminar Shear Strength and Tensile Test at Composite Laminate Level

Macromechanical experiments were conducted on composite panels fabricated with the fiber samples evaluated in Example 7. These macromechanical experimental techniques (ASTM D2344 and ASTM D3039) are standard techniques to qualify carbon fiber sizing formulation for automotive applications. The data is reported in the following table:

| Carbon Fiber Sample | Polyester/epoxy weight ratio | Average ILSS (MPa) |
| --- | --- | --- |
| Commercial, sized carbon fiber: |  |  |
| Sized Fiber A |  | 80 |
| Sized Fiber B |  | 92 |
| Commercial sizing applied to DowAksa carbon fiber |  | 74 |
| Example 2a sizing applied to DowAksa carbon fiber | 70/30 | 87-96 |
| Example 2b sizing applied to DowAksa carbon fiber | 50/50 | 92-100 |

| Carbon Fiber Sample | Polyester/epoxy weight ratio | % tensile translation |
| --- | --- | --- |
| Commercial sized carbon fiber |  |  |
| Fiber A |  | 70 |
| Fiber B |  | 69 |
| Commercial sizing applied to DowAksa carbon fiber |  | 61 |
| Example 2a sizing applied to DowAksa carbon fiber | 70/30 | 68 |
| Example 2b sizing applied to DowAksa carbon fiber | 50/50 | 60 |

The data shows that interlaminar shear strength (ILSS) was observed to be higher using the sizing compositions of Examples 2a and 2b than the existing sizing agent on this fiber product or other commercial carbon fiber products with similar fiber tensile strengths.

EXAMPLE 9

Comparative Example

A sizing composition was prepared using a bis-phenol-A type epoxy functional resin (not a novolac phenolic resin) but no sulfonated polyester resin. This epoxy resin had an epoxy equivalent weight in the range from 3500 to 5500 equivalents. The sizing composition was prepared using the D.E.R 669 solid epoxy resin available from Dow Chemical Co. This resin was dispersed at 55% solids in water using E-SPERSE 100 surfactant solution at a surfactant to epoxy resin ratio of 1:20 by weight.

The solid epoxy resin was fed into a twin-screw extruder by solid feeder. The extruder melt zones were set at 150 ° C. E-SPERSE 100 solution (60% active) was also fed into the melt zone of the extruder at a rate relative to the epoxy feed to provide one part surfactant to 20 parts epoxy resin by weight. An initial stream of deionized (DI) water was fed into the molten epoxy resin/surfactant mixture at the emulsification zone of the extruder. An additional heated dilution stream of DI water stream was introduced into the extruder portion downstream of the emulsification zone to dilute the initial emulsified resin to the desired solids level. After filtration through 190 filters, an epoxy dispersion was obtained with 45% solids.

Particle size distribution of the dispersion was analysed using Beckman Coulter LS13-320 particle size analyzer. The epoxy dispersion hada volume-average mean particle diameter ("$D_v$) of 900 nm.

EXAMPLE 10

Comparative Example

A commercially available epoxy-dispersion from Dow Chemical, OudraSperse™ WB 6001 was used as sizing agent without sulfonated polyester resin. This epoxy resin had a number average molecular weight of 700 to 1200.

EXAMPLE 11

Interfacial Shear Strength Evaluation of Comparative Examples

The IFSS characteristics of the sizing compositions of Examples 9 and 10 were evaluated and compared with the sizing compositions of the present invention. The sizing compositions were applied to carbon fibers as described in Example 4. The data is shown in the following table. The data shows that the IFSS properties are dramatically improved by using an epoxy functional resin in combination with a sulfonated polyester according to the claimed invention.

| Carbon Fiber Sizing | Polyester/epoxy weight ratio | IFSS (MPa) |
| --- | --- | --- |
| Example 9 Comparative | 0/100 | 44 |
| Example 10 Comparative | 0/100 | 57 |
| Example 1a | 70/30 | 81 |
| Example 1b | 50/50 | 85 |

EXAMPLE 12

Epoxy Resin and Non-Sulfonated Polyester Resin (Comparative Example)

An aqueous dispersion of a non-sulfonated polyester resin (14K Mw, FineTone T-382-ES) was prepared as described in U.S. Pat. No. 8,349,531 B2. Instead of sulfonate functionality, this polyester has carboxylic acid functionality. OudraSperse™ WB 6001 epoxy aqueous dispersion (Dow Chemical Co.) was blended with the FineTone T-382-ES dispersion at a composition of 50 wt % of epoxy and 50 wt % of polyester. The subsequent composition was utilized for carbon fiber sizing. This sizing agent was evaluated at the single fiber and the composite laminate level. The data is shown in the following table. The IFSS performance of the sizing compositions was dramatically better than the comparative sizing composition. As another significant advantage of the sizing compositions of the present invention, the sulfonate functionality of the polyester resin is much more inert and non-reactive towards epoxy functionality than is the carboxylic acid functionality. Hence, the sizing compositions of the present invention would be expected to have much more stability and shelf life than that of the comparative example. IFSS numbers were obtained for sizing prepared using a sizing compositions according to Examples 1a and 1b, and ILSS numbers were obtained using a sizing compositions according to Example 2a and 2b.

| Carbon Fiber Sizing Composition | Polyester/epoxy weight ratio | IFSS (MPa) | ILSS (MPa) |
| --- | --- | --- | --- |
| OudraSperse ™ WB 6001 and FineTone T-382-ES dispersion blend sizing | 50/50 | 57 | 90-93 |
| Example 2a | 70/30 | | 87-96 |
| Example 2b | 50/50 | | 92-100 |
| Example 1a | 70/30 | 81 | |
| Example 1b | 50/50 | 85 | |

All patents, patent applications, and publications cited herein are incorporated by reference as if individually incorporated. Unless otherwise indicated, all parts and percentages are by weight and all molecular weights are number average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A sizing composition, comprising:
   a) at least one film forming, epoxy functional, novolac phenolic resin; and
   b) at least one film forming, sulfonated polyester resin having a sulfonate equivalent weight in the range from 2000 to 20,000 and a number average molecular weight in the range from about 1000 to about 100,000; and
   c) an aqueous liquid carrier.

2. The sizing composition of claim 1, wherein the at least one film forming, sulfonated polyester resin has a Tg of at least 35° C.

3. The sizing composition of claim 2, wherein the Tg is at least 50° C.

4. The sizing composition of claim 1, wherein the at least one film forming, sulfonated polyester resin is linear.

5. The sizing composition of claim 1, wherein the at least one film forming sulfonated polyester resin includes one or more polyester linkages, and wherein the at least one film forming, sulfonated polyester resin includes at least one additional polymerized linkage other than the one or more polyester linkages.

6. The sizing composition of claim 1, wherein the at least one film forming, sulfonated polyester resin has a sulfonate equivalent weight in the range from 2000 to 6000.

7. The sizing composition of claim 1, wherein the at least one film forming, sulfonated polyester resin incorporates a plurality of sulfonated backbone moieties according to the following structure, wherein M is a monovalent and/or divalent cation:

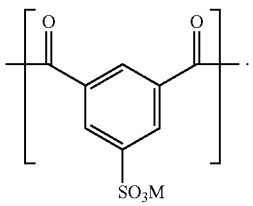

8. The sizing composition of claim 1, wherein the at least one film forming, sulfonated polyester resin incorporates a plurality of sulfo-sulfonated backbone moieties.

9. The sizing composition of claim 1, wherein the at least one film forming, epoxy functional, novolac phenolic resin includes epoxy functionality and at least one other functionality.

10. The sizing composition of claim 9, wherein the at least one other functionality comprises alkyl functionality and /or ether functionality.

11. The sizing composition of claim 9, wherein the at least one film forming, epoxy functional, novolac phenolic resin includes 0.2 to 10 phenolic repeating units on average.

12. The sizing composition of claim 9, wherein the at least one film forming, epoxy functional, novolac phenolic resin includes 0.2 to 4 phenolic repeating units on average.

13. The sizing composition of claim 9, wherein the at least one film forming, epoxy functional, novolac phenolic resin has an epoxy equivalent weight in the range from 150 to 250.

14. The sizing composition of claim 9, wherein the at least one film forming, epoxy functional, novolac phenolic resin has an epoxy equivalent weight in the range from 165 to 190.

15. The sizing composition of claim 9, wherein the at least one film forming, epoxy functional, novolac phenolic resin comprises a structure according to Formula 2, wherein z on average is 0.2 to 50:

16. The sizing composition of claim 1, wherein the sizing composition includes 10 to 60 parts by weight of the at least one film forming, epoxy functional, novalac phenolic resin per 40 to 90 parts by weight of the at least one film forming, sulfonated polyester resin.

17. A fiber reinforced matrix, comprising:
a) a matrix; and
b) at least one coated carbon fiber incorporated into the matrix, said coated carbon fiber comprising:
(i) a carbon fiber; and
(ii) a coating provided on at least a portion of the carbon fiber, said coating being derived from ingredients comprising at least one film forming, epoxy functional, novolac phenolic resin; and at least one film forming, sulfonated polyester resin having a sulfonate equivalent weight in the range from 2000 to 20,000 and a number average molecular weight in the range from about 1000 to about 100,000.

18. A method of making a sizing composition, comprising the steps of:
a) providing at least one film forming, epoxy functional, novolac phenolic resin;
b) providing at least one film forming, sulfonated polyester resin having a sulfonate equivalent weight in the range from 2000 to 20,000 and a number average molecular weight in the range from about 1000 to about 100,000;
c) melting the at least one film forming, epoxy functional, novolac phenolic resin and the at least one film forming, sulfonated polyester resin;
d) blending the melted resins to provide a blended admixture comprising at least one melted, film forming, epoxy functional, novolac phenolic resin and at least one melted film forming, sulfonated polyester resin; and
e) combining the blended admixture with water in a manner effective to provide an aqueous dispersion, wherein at least a portion of said combining occurs while the blended admixture comprises at least one melted, film forming, epoxy functional, novolac phenolic resin and at least one melted film forming, sulfonated polyester resin.

19. The method of claim 18, wherein step (e) comprises using 50 to 200 parts by weight of water per 100 parts by weight of the at least one film forming, sulfonated polyester resin.

20. The method of claim 18, wherein step (c) comprises using 10 to 60 parts by weight of the film forming, epoxy functional, novolac phenolic resin per 40 to 90 parts by weight of the at least one film forming, sulfonated polyester resin.

* * * * *